Sept. 1, 1964
H. A. GILL ETAL
3,147,457
TEMPERATURE PROBE
Filed Aug. 2, 1961
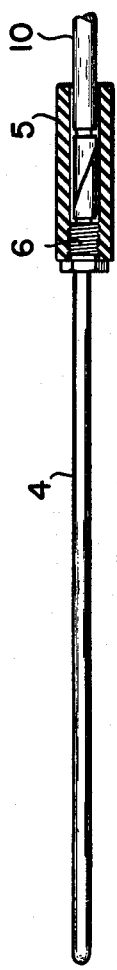
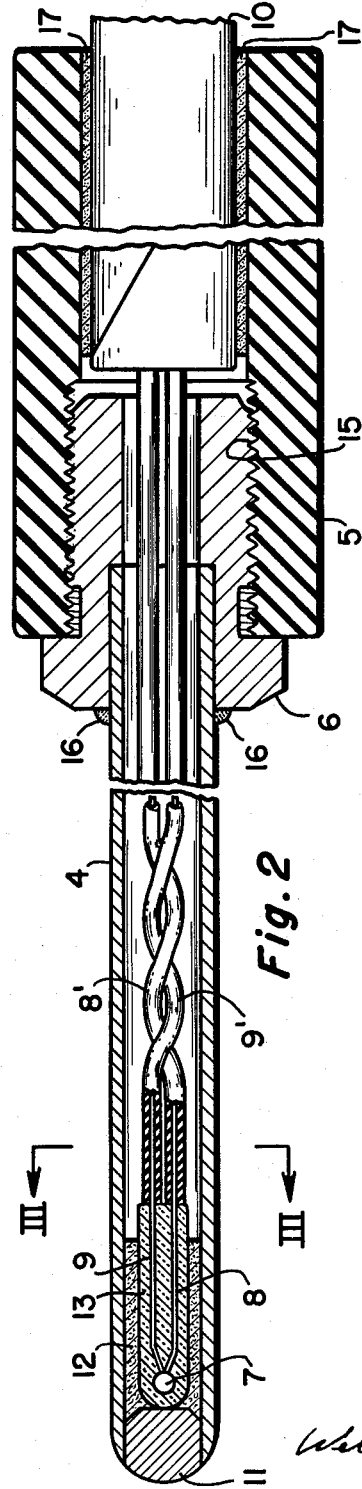
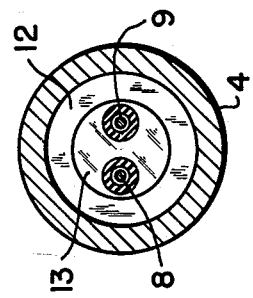
INVENTORS.
Harry A. Gill
Warren Gillingham
BY
*Webb Mackey + Burden*
THEIR ATTORNEYS

United States Patent Office 3,147,457
Patented Sept. 1, 1964

---

3,147,457
TEMPERATURE PROBE
Harry A. Gill, Ridgefield, Conn., and Warren Gillingham, Pittsburgh, Pa., assignors to Fisher Scientific Company, Pittsburgh, Pa., a corporation of Pennsylvania
Filed Aug. 2, 1961, Ser. No. 128,896
3 Claims. (Cl. 338—28)

This application relates to a temperature probe. More particularly, it relates to a temperature probe embodying a temperature-sensitive thermistor encased within a metal tube which is placed against or within the body, the temperature of which is to be determined. As is well known, the electrical resistance of a thermistor varies with temperature and, when the thermistor is connected into a suitable electrical circuit which will measure variations in its resistance, the temperature of the body against which or in which the probe is placed can be determined by suitably calibrated instruments connected into the circuit.

Temperature probes of the type just generally described are conventional. However, such prior probes have had the defect that, in order to obtain from the probe fast responses to changes in temperature, the metal tube forming part of the probe has been joined to the thermistor and, therefore, the tube is electrically connected to one thermistor lead. In such an arrangement the probe can pick up ambient signals which destroy the accuracy of the probe and this limits the possible uses of the probe. The associated circuitry is also limited in this case because one side of the thermistor must usually be grounded.

The problems created by the necessity for electrically insulating the thermistor from its surroundings have been solved by making the tube of glass, but the glass tube must be thin in order to transmit heat quickly and, therefore, is very fragile.

We have invented a temperature probe including a thermistor which is sensitive to changes in temperature and which is encased in a metal tube which is electrically insulated from the thermistor and which, therefore, is not connected electrically into the circuit into which the thermistor is connected. At the same time, a probe made in accordance with our invention will give rapid responses to temperature changes.

In the accompanying drawings, we have illustrated a presently preferred embodiment of our invention, in which:

FIGURE 1 is a side view partially in section of our thermistor probe;

FIGURE 2 is a vertical, longitudinal section of our probe on a scale larger than that used in FIGURE 1; and FIGURE 3 is a section along the lines III—III in FIGURE 2.

Referring to FIGURE 1 of the drawings, our temperature probe comprises a hollow, elongated metal tube 4 having at one end a handle 5 of electrical insulating material which is mounted on the tube by a bushing 6. As is shown in FIGURE 2, the end of the tube 4 away from the handle 5 is closed and a thermistor 7 is positioned within the tube against this closed end. Electrical leads 8 and 9 are connected to the thermistor and extend through the tube and out the open end of the tube where they are connected to a coaxial cable 10 which leads to a circuit (not shown) which measures variations in the resistance of the thermistor 7 in accordance with the temperature to which it is subjected.

Referring more particularly to FIGURE 2, the end of the tube 4 in which the thermistor 7 is located is closed by a plug 11 which is press-fitted into the tube, following which the tube and the plug are ground so that the end of the tube and the plug are rounded and smooth, as shown in FIGURE 2.

Before the plug 11 is pressed into the tube, a heat-conducting and electrically-insulating material 12 comprising equal portions by volume of a silicone grease, such as that known as Dow Corning No. 3, and aluminum powder is inserted into the tube in sufficient amount to surround the thermistor 7 and portions of the leads 8 and 9 adjacent the bead. In practice, we have found that a column of grease within the tube approximately $\%_{16}''$ long and filling the interior of the tube back of the plug 11 for $\%_{16}''$ gives good results.

As is also shown in FIGURE 2, the thermistor 7 and portions of the leads 8 and 9 adjacent the bead are enclosed in a glass envelope 13. The length of the leads 8 and 9 outside of the glass envelope 13 is enclosed within No. 28 gauge, thin-wall "Teflon," "spaghetti" electrically-insulating tubing 8' and 9'. This tubing is pressed tightly against the end of the glass envelope 13 and the leads 8 and 9 are twisted three times, as shown in FIGURE 2, to hold the ends of the "spaghetti" against the glass envelope 13.

During assembly of the probe, the glass envelope 13 containing the thermistor 7 and the leads 8 and 9 is pressed firmly through the heat-conducting and electrically-insulating material 12 so that the end of the envelope engages the inner surface of the plug 11. As shown in FIGURE 2, the heat-conducting material 12 surrounds the glass envelope 13 and contacts the inner walls of the tube 4 so that heat is transmitted very rapidly from the exterior surface of the plug 11 and the end of the tube 4 to the thermistor 7.

The end of the metal tube 4 opposite to the end in which the thermistor 7 is located fits into a metal bushing 6 which has an externally threaded cylindrical portion 15. The tube 4 is soldered to the bushing 6 at 16 and a hollow cylindrical handle 5 has at one end interior threads which are threaded over the cylindrical portion 15 of the bushing 6. The coaxial cable 10 extends into the handle 5 from the end opposite to the end into which the tube 4 extends and is secured in the handle by cement 17. The leads 8 and 9 extend through the bushing 6 and are connected to the coaxial cable in a conventional manner.

The heat-conducting and electrically-insulating material (silicone grease and aluminum powder) can also be used to improve the performance of probes having non-metallic outer tubes by packing the material around the thermistors and against the ends and adjacent inner walls of the outer tubes.

From the foregoing, it is apparent that we have invented a temperature probe which may be easily assembled and which has two important features. First, the exterior metal tube of the probe is not electrically connected to the thermistor and, therefore, is not connected into the circuit for measuring the resistance of the thermistor. Second, because a heat-conducting material surrounds the bead and is in contact with the end of the probe and with the interior walls of the tube adjacent the ends of the probe, the probe has very rapid response to changes in temperature. The thermistor leads are electrically insulated from the outer tube, as is also the handle; and, therefore, the probe can be used to measure the temperature of metal conductors which are not at ground potential. Conversely, it can be used to measure the temperature of conductors which are grounded.

While we have described a presently preferred embodiment of our invention, it is to be understood that it may be otherwise variously embodied within the scope of the appended claims.

We claim:

1. A temperature probe comprising a hollow tube closed at one end, a thermistor within the tube and positioned adjacent the closed end, leads connected to the thermistor and extending through the tube and out the open end of the tube, a glass envelope enclosing the thermistor and portions of the leads adjacent the thermistor, and a heat-conducting and electrically-insulating material surrounding said envelope, said material also contacting the closed end and interior side walls of said tube adjacent the thermistor.

2. A temperature probe as described in claim 1 in which the heat-conducting and electrically insulating material is a mixture of silicone grease and aluminum powder.

3. A temperature probe as described in claim 1 in which the heat-conducting and electrically insulating material is a mixture of equal proportions of silicone grease and aluminum powder.

References Cited in the file of this patent
UNITED STATES PATENTS

| | | |
|---|---|---|
| 2,528,243 | Quinn | Oct. 31, 1950 |
| 2,559,077 | Johnson et al. | July 3, 1951 |
| 2,588,014 | Knudsen | Mar. 4, 1952 |
| 2,590,041 | Roost | Mar. 18, 1952 |